United States Patent
Hao et al.

(10) Patent No.: US 10,635,224 B2
(45) Date of Patent: Apr. 28, 2020

(54) INFORMATION INPUT METHOD AND APPARATUS FOR TOUCH SCREEN

(71) Applicant: ZTE Corporation, Shenzhen (CN)

(72) Inventors: Zhijian Hao, Shenzhen (CN); Shifeng Que, Shenzhen (CN); Chong Zhou, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 1 day.

(21) Appl. No.: 15/771,709

(22) PCT Filed: Mar. 24, 2016

(86) PCT No.: PCT/CN2016/077269
§ 371 (c)(1),
(2) Date: Apr. 27, 2018

(87) PCT Pub. No.: WO2016/188215
PCT Pub. Date: Dec. 1, 2016

(65) Prior Publication Data
US 2018/0348946 A1 Dec. 6, 2018

(30) Foreign Application Priority Data
Oct. 27, 2015 (CN) .......................... 2015 1 0706497

(51) Int. Cl.
*G06F 3/041* (2006.01)
*G06F 3/0488* (2013.01)
*G06F 3/0484* (2013.01)

(52) U.S. Cl.
CPC ........ *G06F 3/0416* (2013.01); *G06F 3/04886* (2013.01); *G06F 3/04842* (2013.01); *G06F 2203/04105* (2013.01)

(58) Field of Classification Search
CPC ........ G06F 2203/04105; G06F 3/0416; G06F 3/04886; G06F 3/04842
See application file for complete search history.

(56) References Cited

U.S. PATENT DOCUMENTS

| | | | | |
|---|---|---|---|---|
| 2011/0141053 A1* | 6/2011 | Bulea | .................... | G06F 3/0416 345/174 |
| 2011/0248948 A1* | 10/2011 | Griffin | .................... | G06F 3/041 345/174 |
| 2012/0054665 A1* | 3/2012 | Kano | .................. | G06F 3/04847 715/776 |

FOREIGN PATENT DOCUMENTS

| | | |
|---|---|---|
| CN | 101923388 A | 12/2010 |
| CN | 102385452 A | 3/2012 |

(Continued)

OTHER PUBLICATIONS

PCT International Application No. PCT/CN2016/077269; dated Aug. 3, 2016, pp. 4.

*Primary Examiner* — Kent W Chang
*Assistant Examiner* — Chayce R Bibbee
(74) *Attorney, Agent, or Firm* — Cantor Colburn LLP

(57) ABSTRACT

An information input method and apparatus for a touch screen are provided. The method includes acquiring a contact parameter and a contact position between an object and a touch screen. The contact parameter at least includes a pressure value exerted on the touch screen by the object and a contact area between the object and the touch screen, generating, according to the contact parameter and the contact position, a corresponding operation instruction, and executing, according to the operation instruction, a corresponding operation.

8 Claims, 4 Drawing Sheets

(56) References Cited

FOREIGN PATENT DOCUMENTS

| CN | 103092483 A | 5/2013 |
|----|-------------|--------|
| CN | 103376929 A | 10/2013 |
| CN | 103777769 A | 5/2014 |

\* cited by examiner

INFORMATION INPUT METHOD AND APPARATUS FOR TOUCH SCREEN

TECHNICAL FIELD

The disclosure relates to the field of mobile communications, and more particularly to an information input method and apparatus for a touch screen.

BACKGROUND

With the development of a mobile communication technology, electronic products with touch screens have been seen everywhere in daily life. Touch control operations on the traditional electronic products are mostly two-dimensional. A pressed position can only be determined for the input of a touch screen through horizontal and longitudinal coordinates. That is, a traditional touch control is a two-dimensional plane, and the flexibility of the control is greatly limited. For example, for an input method application, under an English input mode, two characters of upper and lower case formats of a letter occupy an input control, and when the case formats are switched, it is also often necessary to click a case switch control, so that the operation is tedious; and moreover, each English letter and punctuation mark respectively occupy one space, thereby resulting in small space and easily causing misoperation.

With the rapid development of electronic products, pressure screens have also emerged. Therefore, it is desirable to provide a touch control method capable of achieving three-dimensional effects, implementing a three-dimensional touch control, and solving the restrictions of a two-dimensional touch control method.

SUMMARY

The embodiments of the disclosure provide an information input method and apparatus for a touch screen, intended to solve the problem that the control flexibility of a two-dimensional touch control method is greatly limited and has certain restrictions.

According to an aspect, an embodiment of the disclosure provides an information input method for a touch screen, which includes the steps as follows.

A contact parameter and a contact position between an object and a touch screen are acquired, wherein the contact parameter at least includes: a pressure value exerted on the touch screen by the object and a contact area between the object and the touch screen.

According to the contact parameter and the contact position, a corresponding operation instruction is generated.

According to the operation instruction, a corresponding operation is executed.

In another embodiment, the step that a corresponding operation instruction is generated according to the contact parameter and the contact position specifically includes:

a control is determined from a plurality of controls according to coordinates of the contact position, wherein each control corresponds to two or more characters;

a preset pressure threshold and a preset contact area threshold corresponding to the determined control are acquired; and an operation instruction instructing the control to display the corresponding characters is generated according to the contact parameter and the preset pressure threshold as well as the preset contact area threshold.

In another embodiment, the step that an operation instruction instructing the control to display the corresponding characters is generated according to the contact parameter and the preset pressure threshold as well as the preset contact area threshold specifically includes:

when the pressure value exerted on the touch screen by the object is smaller than a pressure threshold and the contact area is smaller than a contact area threshold, a first instruction is generated, the first instruction being used to instruct the control to display a first character; or, when the pressure value exerted on the touch screen by the object is smaller than a pressure threshold and the contact area is greater than or equal to a contact area threshold, a second instruction is generated, the second instruction being used to instruct the control to display a second character; or, when the pressure value exerted on the touch screen by the object is greater than or equal to a pressure threshold, a third instruction is generated, the third instruction being used to instruct the control to display a third character.

In another embodiment, the step that an operation instruction instructing the control to display the corresponding characters is generated according to the contact parameter and the preset pressure threshold as well as the preset contact area threshold specifically includes:

when the contact area is smaller than a contact area threshold and the pressure value exerted on the touch screen by the object is smaller than a pressure threshold, a fourth instruction is generated, the fourth instruction being used to instruct the control to display a fourth character; or, when the contact area is smaller than a contact area threshold and the pressure value exerted on the touch screen by the object is greater than or equal to a pressure threshold, a fifth instruction is generated, the fifth instruction being used to instruct the control to display a fifth character; or, when the contact area is greater than or equal to a contact area threshold, a sixth instruction is generated, the sixth instruction being used to instruct the control to display a sixth character.

In another embodiment, the pressure value is a maximum pressure value exerted on the touch screen by the object during a process of the object clicking on and departing from the touch screen, and the contact area is a maximum contact area between the object and the touch screen during a process of the object clicking on and departing from the touch screen.

According to another aspect, an embodiment of the disclosure also provides an information input apparatus for a touch screen, which includes:

an acquisition module, configured to acquire a contact parameter and a contact position between an object and a touch screen, wherein the contact parameter at least includes: a pressure value exerted on the touch screen by the object and a contact area between the object and the touch screen;

a generation module, configured to generate, according to the contact parameter and the contact position, a corresponding operation instruction; and an execution module, configured to execute, according to the operation instruction, a corresponding operation.

In another embodiment, the generation module specifically includes:

a determination sub-module, configured to determine a control from a plurality of controls according to coordinates of the contact position, wherein each control corresponds to two or more characters;

an acquisition sub-module, configured to acquire a preset pressure threshold and a preset contact area threshold corresponding to the determined control; and an instruction generation sub-module, configured to generate, according to the contact parameter and the preset pressure threshold as well as the preset contact area threshold, an operation instruction instructing the control to display the corresponding characters.

In another embodiment, the instruction generation sub-module specifically includes:

a first generation unit, configured to generate, when the pressure value exerted on the touch screen by the object is smaller than a pressure threshold and the contact area is smaller than a contact area threshold, a first instruction, the first instruction being used to instruct the control to display a first character; or, a second generation unit, configured to generate, when the pressure value exerted on the touch screen by the object is smaller than a pressure threshold and the contact area is greater than or equal to a contact area threshold, a second instruction, the second instruction being used to instruct the control to display a second character; or, a third generation unit, configured to generate, when the pressure value exerted on the touch screen by the object is greater than or equal to a pressure threshold, a third instruction, the third instruction being used to instruct the control to display a third character.

In another embodiment, the instruction generation sub-module specifically includes:

a fourth generation unit, configured to generate, when the contact area is smaller than a contact area threshold and the pressure value exerted on the touch screen by the object is smaller than a pressure threshold, a fourth instruction, the fourth instruction being used to instruct the control to display a fourth character; or, a fifth generation unit, configured to generate, when the contact area is smaller than a contact area threshold and the pressure value exerted on the touch screen by the object is greater than or equal to a pressure threshold, a fifth instruction, the fifth instruction being used to instruct the control to display a fifth character; or, a sixth generation unit, configured to generate, when the contact area is greater than or equal to a contact area threshold, a sixth instruction, the sixth instruction being used to instruct the control to display a sixth character.

In another embodiment, the pressure value is a maximum pressure value exerted on the touch screen by the object during a process of the object clicking on and departing from the touch screen, and the contact area is a maximum contact area between the object and the touch screen during a process of the object clicking on and departing from the touch screen.

In the embodiments of the disclosure, a computer storage medium is also provided. The computer storage medium may store an execution instruction, the execution instruction being used to execute the information input method for a touch screen in the above embodiment.

The above solution of the embodiments of the disclosure at least includes the beneficial effects as follows.

According to the information input method and apparatus for a touch screen provided by the embodiments of the disclosure, a contact parameter and a contact position between an object and a touch screen are acquired, and a corresponding operation instruction is generated according to the contact parameter and the contact position, so that a three-dimensional touch control is achieved. For the control containing two or more characters, a corresponding character may be selected by means of a single input operation, and the process is simple and convenient. Moreover, the disclosure enables a plurality of characters to reuse one control, such that the area of the control can be increased, thus the occurrence of misoperation is reduced, accordingly the input speed is increased, and the restriction of two-dimensional input is solved.

DETAILED DESCRIPTION OF THE EMBODIMENTS

In order to make the technical problems, technical solutions and advantages to be solved in the disclosure clearer, the following will describe embodiments in detail with reference to the accompanying drawings and specific embodiments.

Touch control methods for traditional electronic products are mostly two-dimensional. A pressed position is determined for the input of a touch screen through horizontal and longitudinal coordinates. The flexibility of the control is limited. Therefore, to solve the existing problems, the disclosure provides an information input method and apparatus for a touch screen.

Embodiment One

Figure 1:
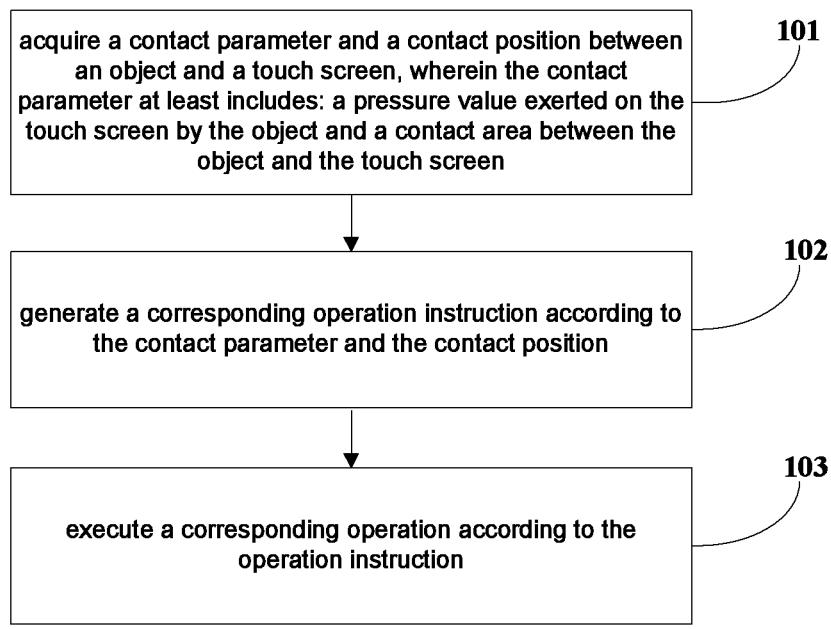
FIG. 1 is a flowchart of an information input method for a touch screen provided in an embodiment one of the disclosure.

Referring to FIG. 1, the embodiment one of the disclosure provides an information input method for a touch screen, which includes the steps 101 to 103 as follows.

In step 101, a contact parameter and a contact position between an object and a touch screen are acquired. Herein the contact parameter at least includes: a pressure value exerted on the touch screen by the object and a contact area between the object and the touch screen.

The object may be a finger of a user or a touch screen input pen, for example.

The contact area and the contact position may be collected by a touch chip, and a pressure value may be collected by means of a pressure sensor.

In another embodiment, the pressure value is a maximum pressure value exerted on the touch screen by the object during a process of the object clicking on and departing from the touch screen. And the contact area is a maximum contact area between the object and the touch screen during a process of the object clicking on and departing from the touch screen. Usually, the pressure value exerted on the touch screen by the user in a single operation process or the contact area in contact with the touch screen is gradually changed and is a variable. Therefore, a maximum value is used to determine the values of two parameters, so as to avoid difficulty in determining the value of the variable.

In step 102, according to the contact parameter and the contact position, a corresponding operation instruction is generated.

The operation instruction is used to instruct a corresponding control to display a certain character on the control, and in a one-touch operation of the user, the contact position is constant, and there may be multiple contact parameters, so each contact parameter may determine one operation instruction. For example, for an input method application, different operation instructions may be made to correspond to different input characters. When a control corresponds to at least two characters, the user can select a corresponding character by a single input operation.

In step 103, A corresponding operation is executed according to the operation instruction.

In the above embodiment of the disclosure, a contact parameter and a contact position between an object and a touch screen are acquired, and a corresponding operation instruction is generated according to the contact parameter and the contact position, so that a three-dimensional touch control is achieved. A corresponding character of a control containing two or more characters may be selected by means of a single input operation, and the process is simple and convenient. And moreover, the disclosure enables a plurality of characters to reuse one control, such that the area of the control can be increased, the occurrence of misoperation is reduced, the input speed is increased, and the restriction of two-dimensional input is solved.

Embodiment Two

Figure 2:
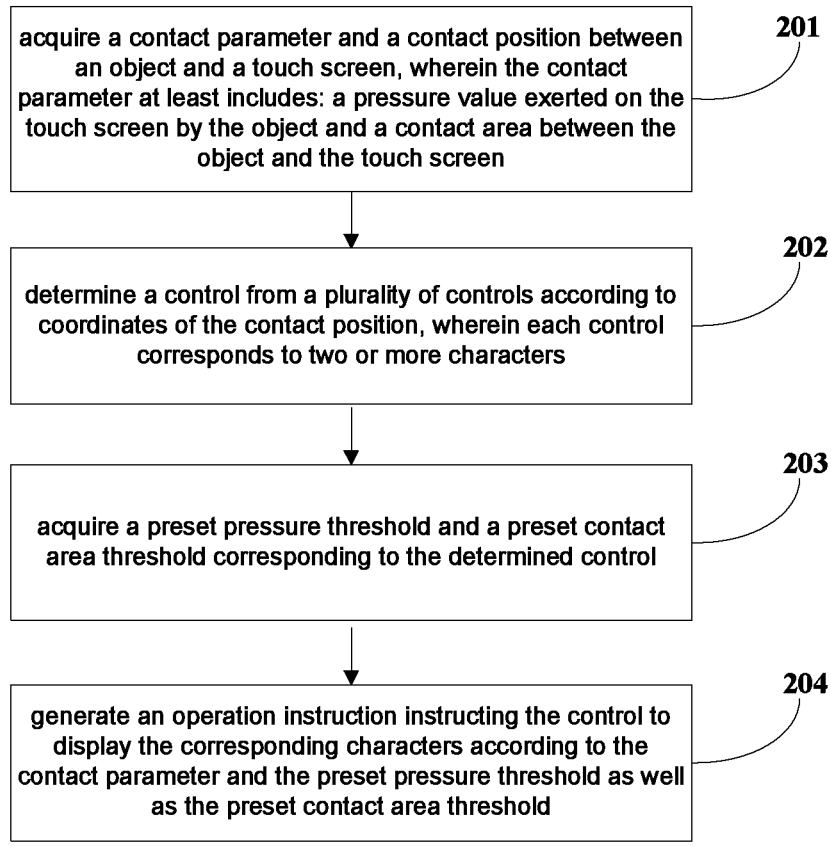
FIG. 2 is a flowchart of an information input method for a touch screen provided in an embodiment two of the disclosure.

Referring to FIG. 2, the embodiment two of the disclosure provides an information input method for a touch screen, which includes the steps 201 to 204 as follows.

In step 201, a contact parameter and a contact position between an object and a touch screen are acquired, and the contact parameter at least includes: a pressure value exerted on the touch screen by the object and a contact area between the object and the touch screen.

In another embodiment, the pressure value is a maximum pressure value exerted on the touch screen by the object during a process of the object clicking on and departing from the touch screen, and the contact area is a maximum contact area between the object and the touch screen during a process of the object clicking on and departing from the touch screen.

In step 202, a control is determined from a plurality of controls according to coordinates of the contact position, and each control corresponds to two or more characters.

In step 203, a preset pressure threshold and a preset contact area threshold corresponding to the determined control are acquired.

In step 204, an operation instruction instructing the control to display the corresponding characters is generated according to the contact parameter and the preset pressure threshold as well as the preset contact area threshold.

In the above embodiment of the disclosure, a corresponding control is determined according to coordinates of a contact position, and a corresponding operation instruction is generated by comparing a pressure value in a contact parameter with a preset pressure threshold and comparing a contact area with a preset contact area threshold. The operation instruction is generated by combining three parameters namely the coordinates of the contact position, the pressure value exerted on a touch screen by an object and the contact area between the object and the touch screen, so that a three-dimensional touch control is achieved, and a more intuitive and rapid experience is brought to a user.

Embodiment Three

Figure 3:
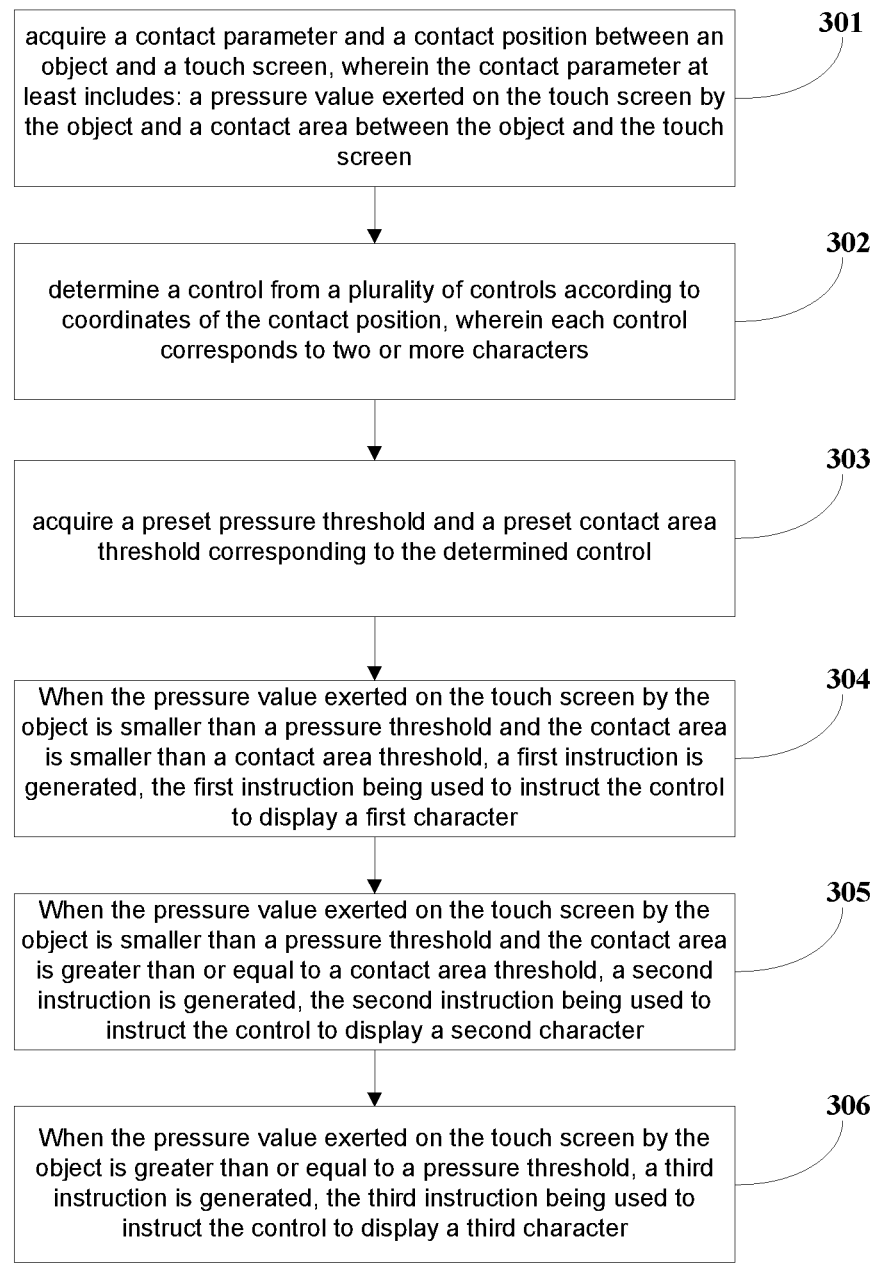
FIG. 3 is a flowchart of an information input method for a touch screen provided in an embodiment three of the disclosure.

Referring to FIG. 3, the embodiment three of the disclosure provides an information input method for a touch screen, which includes the steps 301 to 306 as follows.

In step 301, a contact parameter and a contact position between an object and a touch screen are acquired. And the contact parameter at least includes: a pressure value exerted on the touch screen by the object and a contact area between the object and the touch screen. In another embodiment, the pressure value is a maximum pressure value exerted on the touch screen by the object during a process of the object clicking on and departing from the touch screen, and the contact area is a maximum contact area between the object and the touch screen during a process of the object clicking on and departing from the touch screen.

In step 302, a control is determined from a plurality of controls according to coordinates of the contact position, and each control corresponds to two or more characters.

In step 303, a preset pressure threshold and a preset contact area threshold corresponding to the determined control are acquired.

In step 304, when the pressure value exerted on the touch screen by the object is smaller than a pressure threshold and the contact area is smaller than a contact area threshold, a first instruction is generated, the first instruction being used to instruct the control to display a first character; or, in step 305, when the pressure value exerted on the touch screen by the object is smaller than a pressure threshold and the contact area is greater than or equal to a contact area threshold, a second instruction is generated, the second instruction being used to instruct the control to display a second character; or, in step 306, when the pressure value exerted on the touch screen by the object is greater than or equal to a pressure threshold, a third instruction is generated, the third instruction being used to instruct the control to display a third character.

In the above embodiment of the disclosure, firstly, a corresponding control is determined according to coordinates of a contact position point. If there are two or more characters in the space, a pressure value and a pressure threshold are compared, and a contact area and a contact area threshold are compared. If the pressure value is smaller than the pressure threshold and the contact area is smaller than the contact area threshold, a first instruction for instructing the control to display a first character is generated. If the pressure value is smaller than the pressure threshold and the contact area is greater than or equal to the contact area threshold, a second instruction for instructing the control to display a second character is generated. When the pressure value is greater than or equal to the pressure threshold, a third instruction for instructing the control to display a third character is generated. For example, for an input method application, when a control contains upper and lower cases of a letter (the upper and lower cases are the first and second characters on the control, respectively) or upper and lower cases of a letter and a punctuation mark (the upper and lower cases and the punctuation mark are the first character, the second character, and the third character on the control, respectively), different pressure values and contact areas correspond to different characters, and a corresponding character may be selected by a single input operation, the process is simple and convenient, the area of the input control can be increased, and the occurrence of misoperation is reduced.

Embodiment Four

Figure 4:
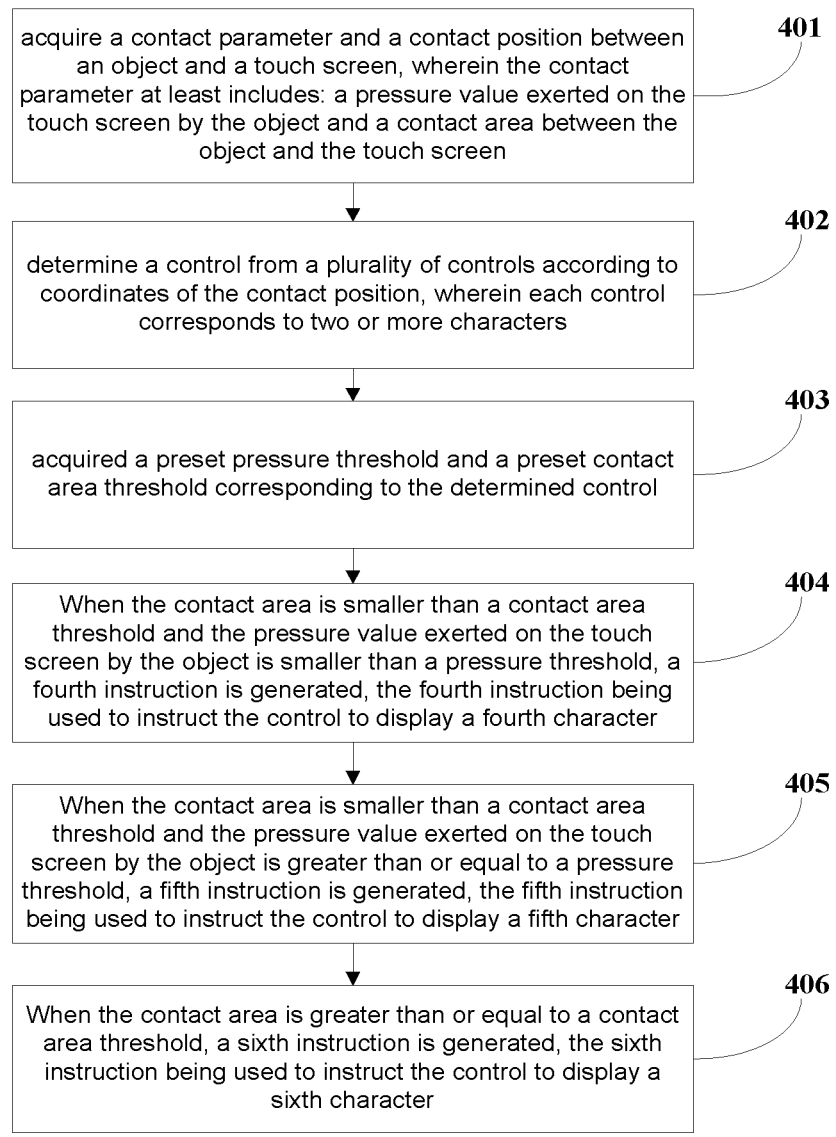
FIG. 4 is a flowchart of an information input method for a touch screen provided in an embodiment four of the disclosure.

Referring to FIG. 4, the embodiment four of the disclosure provides an information input method for a touch screen, which includes the steps 401 to 406 as follows.

In step 401, a contact parameter and a contact position between an object and a touch screen are acquired, and the contact parameter at least includes: a pressure value exerted on the touch screen by the object and a contact area between the object and the touch screen.

In step 402, a control is determined from a plurality of controls according to coordinates of the contact position, and each control corresponds to two or more characters.

In step 403, a preset pressure threshold and a preset contact area threshold corresponding to the determined control are acquired.

In step 404, when the contact area is smaller than a contact area threshold and the pressure value exerted on the touch screen by the object is smaller than a pressure threshold, a fourth instruction is generated, the fourth instruction being used to instruct the control to display a fourth character; or, in step 405, when the contact area is smaller than a contact area threshold and the pressure value exerted on the touch screen by the object is greater than or equal to a pressure threshold, a fifth instruction is generated, the fifth instruction being used to instruct the control to display a fifth character; or, in step 406, when the contact area is greater than or equal to a contact area threshold, a sixth instruction is generated, the sixth instruction being used to instruct the control to display a sixth character.

In the above embodiment of the disclosure, firstly, a corresponding control is determined according to coordinates of a contact position point, if there are two or more characters in the space, a pressure value and a pressure threshold are compared, and a contact area and a contact area threshold are compared; if the contact area is smaller than the contact area threshold and the pressure value is smaller than the pressure threshold, a fourth instruction for instructing the control to display a fourth character is generated; or, if the contact area is greater than or equal to the contact area threshold and the pressure value is smaller than the pressure threshold, a fifth instruction for instructing the control to display a fifth character is generated; or, if the contact area is greater than or equal to the contact area threshold, a sixth instruction for instructing the control to display a sixth character is generated. For example, for an input method application, when a control contains upper and lower cases of a letter (the upper and lower cases are the fourth and fifth characters on the control, respectively) or upper and lower cases of a letter and a punctuation mark (the upper and lower cases and the punctuation mark are the fourth character, the fifth character, and the sixth character on the control, respectively), different pressure values and contact areas correspond to different characters, and a corresponding character may be selected by a single input operation, the process is simple and convenient, the area of the input control can be increased, and the occurrence of misoperation is reduced.

Embodiment Five

Figure 5:
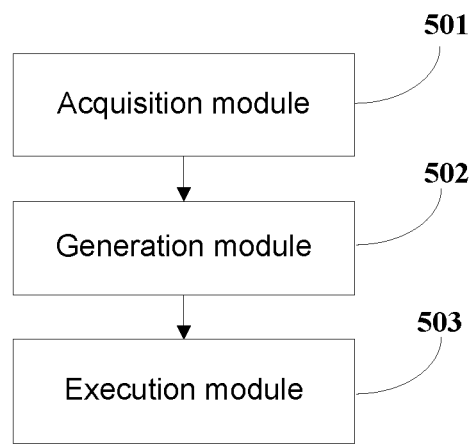
FIG. 5 is a schematic structure diagram of an information input apparatus for a touch screen provided in an embodiment five of the disclosure.

Referring to FIG. 5, the embodiment five provides an information input apparatus for a touch screen, which includes:

an acquisition module 501, configured to acquire a contact parameter and a contact position between an object and a touch screen, and the contact parameter at least includes: a pressure value exerted on the touch screen by the object and a contact area between the object and the touch screen;

a generation module 502, configured to generate, according to the contact parameter and the contact position, a corresponding operation instruction; and an execution module 503, configured to execute, according to the operation instruction, a corresponding operation.

In the above embodiment of the disclosure, a contact parameter and a contact position between an object and a touch screen are acquired, and a corresponding operation instruction is generated according to the contact parameter and the contact position, so that a three-dimensional touch control is achieved; a corresponding character of a control containing two or more characters may be selected by means of a single input operation, and the process is simple and convenient; and moreover, the disclosure enables a plurality of characters to reuse one control, such that the area of the control can be increased, the occurrence of misoperation is reduced, the input speed is increased, and the restriction of two-dimensional input is solved.

In the above embodiment of the disclosure, the generation module 502 specifically includes:

a determination sub-module, configured to determine a control from a plurality of controls according to coordinates of the contact position, and each control corresponds to two or more characters;

an acquisition sub-module, configured to acquire a preset pressure threshold and a preset contact area threshold corresponding to the determined control; and an instruction generation sub-module, configured to generate, according to the contact parameter and the preset pressure threshold as well as the preset contact area threshold, an operation instruction instructing the control to display the corresponding characters.

In the above embodiment of the disclosure, the instruction generation sub-module specifically includes:

a first generation unit, configured to generate, when the pressure value exerted on the touch screen by the object is smaller than a pressure threshold and the contact area is smaller than a contact area threshold, a first instruction, the first instruction being used to instruct the control to display a first character; or, a second generation unit, configured to generate, when the pressure value exerted on the touch screen by the object is smaller than a pressure threshold and the contact area is greater than or equal to a contact area threshold, a second instruction, the second instruction being used to instruct the control to display a second character; or, a third generation unit, configured to generate, when the pressure value exerted on the touch screen by the object is greater than or equal to a pressure threshold, a third instruction, the third instruction being used to instruct the control to display a third character.

In the above embodiment of the disclosure, the instruction generation sub-module specifically includes:

a fourth generation unit, configured to generate, when the contact area is smaller than a contact area threshold and the pressure value exerted on the touch screen by the object is smaller than a pressure threshold, a fourth instruction, the fourth instruction being used to instruct the control to display a fourth character; or, a fifth generation unit, configured to generate, when the contact area is smaller than a contact area threshold and the pressure value exerted on the touch screen by the object is greater than or equal to a pressure threshold, a fifth instruction, the fifth instruction being used to instruct the control to display a fifth character; or, a sixth generation unit, configured to generate, when the contact area is greater than or equal to a contact area threshold, a sixth instruction, the sixth instruction being used to instruct the control to display a sixth character.

In the above embodiment of the disclosure, the pressure value is a maximum pressure value exerted on the touch screen by the object during a process of the object clicking on and departing from the touch screen, and the contact area is a maximum contact area of the object that comes into contact with the touch screen during a process of the object clicking on and departing from the touch screen.

It should be noted that the information input apparatus for a touch screen provided by the embodiment of the disclosure is an apparatus applying the above method, that is, all the embodiments of the above method are applicable to the apparatus and all can achieve the same or similar beneficial effects.

The above description is a preferred embodiment of the disclosure. It should be pointed out that for those skilled in the art, several improvements and improvements can be made without departing from the principle of the disclosure. These improvements and modifications should also be regarded as the protection scope of the disclosure.

What is claimed is:

1. An information input method for a touch screen, comprising:
    acquiring a contact parameter and a contact position between an object and a touch screen, wherein the contact parameter at least comprises: a pressure value exerted on the touch screen by the object and a contact area between the object and the touch screen;
    generating, according to the contact parameter and the contact position, a corresponding operation instruction; and
    executing, according to the operation instruction, a corresponding operation;
    wherein the step of generating, according to the contact parameter and the contact position, a corresponding operation instruction comprises:
    determining an input control from a plurality of input controls according to coordinates of the contact position, wherein each input control corresponds to two or more input characters;
    acquiring a preset pressure threshold and a preset contact area threshold corresponding to the determined input control; and
    generating, according to the contact parameter and the preset pressure threshold as well as the preset contact area threshold, an operation instruction instructing the input control to display the corresponding characters;
    wherein the step of generating, according to the contact parameter and the preset pressure threshold as well as the preset contact area threshold, an operation instruction instructing the input control to display the corresponding input characters comprises:
    generating, when the pressure value exerted on the touch screen by the object is smaller than a pressure threshold and the contact area is smaller than a contact area threshold, a first instruction, the first instruction being used to instruct the input control to display a first input character;
    generating, when the pressure value exerted on the touch screen by the object is smaller than a pressure threshold and the contact area is greater than or equal to a contact area threshold, a second instruction, the second instruction being used to instruct the input control to display a second input character;
    generating, when the pressure value exerted on the touch screen by the object is greater than or equal to a pressure threshold, a third instruction, the third instruction being used to instruct the input control to display a third input character.

2. The method as claimed in claim 1, wherein the step of generating, according to the contact parameter and the preset pressure threshold as well as the preset contact area threshold, an operation instruction instructing the input control to display the corresponding input characters comprises:
    generating, when the contact area is smaller than a contact area threshold and the pressure value exerted on the touch screen by the object is smaller than a pressure threshold, a fourth instruction, the fourth instruction being used to instruct the input control to display a fourth input character; or,
    generating, when the contact area is smaller than a contact area threshold and the pressure value exerted on the touch screen by the object is greater than or equal to a pressure threshold, a fifth instruction, the fifth instruction being used to instruct the input control to display a fifth input character; or,
    generating, when the contact area is greater than or equal to a contact area threshold, a sixth instruction, the sixth instruction being used to instruct the input control to display a sixth input character.

3. The method as claimed in claim 1, wherein the pressure value is a maximum pressure value exerted on the touch screen by the object during a process of the object clicking on and departing from the touch screen, and the contact area is a maximum contact area between the object and the touch screen during a process of the object clicking on and departing from the touch screen.

4. An information input apparatus for a touch screen, comprising:
    an acquisition module, configured to acquire a contact parameter and a contact position between an object and a touch screen, wherein the contact parameter at least comprises: a pressure value exerted on the touch screen by the object and a contact area between the object and the touch screen;
    a generation module, configured to generate, according to the contact parameter and the contact position, a corresponding operation instruction; and
    an execution module, configured to execute, according to the operation instruction, a corresponding operation;
    wherein the generation module comprises:
    a determination sub-module, configured to determine an input control from a plurality of input controls according to coordinates of the contact position, wherein each input control corresponds to two or more input characters;
    an acquisition sub-module, configured to acquire a preset pressure threshold and a preset contact area threshold corresponding to the determined input control; and
    an instruction generation sub-module, configured to generate, according to the contact parameter and the preset pressure threshold as well as the preset contact area threshold, an operation instruction instructing the input control to display the corresponding input characters;
    wherein the instruction generation sub-module comprises:
    a first generation unit, configured to generate, when the pressure value exerted on the touch screen by the object is smaller than a pressure threshold and the contact area is smaller than a contact area threshold, a first instruction, the first instruction being used to instruct the input control to display a first input character;

a second generation unit, configured to generate, when the pressure value exerted on the touch screen by the object is smaller than a pressure threshold and the contact area is greater than or equal to a contact area threshold, a second instruction, the second instruction being used to instruct the input control to display a second input character;

a third generation unit, configured to generate, when the pressure value exerted on the touch screen by the object is greater than or equal to a pressure threshold, a third instruction, the third instruction being used to instruct the input control to display a third input character.

5. The apparatus as claimed in claim 4, wherein the instruction generation sub-module comprises:

a fourth generation unit, configured to generate, when the contact area is smaller than a contact area threshold and the pressure value exerted on the touch screen by the object is smaller than a pressure threshold, a fourth instruction, the fourth instruction being used to instruct the input control to display a fourth input character; or, a fifth generation unit, configured to generate, when the contact area is smaller than a contact area threshold and the pressure value exerted on the touch screen by the object is greater than or equal to a pressure threshold, a fifth instruction, the fifth instruction being used to instruct the input control to display a fifth input character; or, a sixth generation unit, configured to generate, when the contact area is greater than or equal to a contact area threshold, a sixth instruction, the sixth instruction being used to instruct the input control to display a sixth input character.

6. The apparatus as claimed in claim 4, wherein the pressure value is a maximum pressure value exerted on the touch screen by the object during a process of the object clicking on and departing from the touch screen, and the contact area is a maximum contact area between the object and the touch screen during a process of the object clicking on and departing from the touch screen.

7. The method as claimed in claim 2, wherein the pressure value is a maximum pressure value exerted on the touch screen by the object during a process of the object clicking on and departing from the touch screen, and the contact area is a maximum contact area between the object and the touch screen during a process of the object clicking on and departing from the touch screen.

8. The apparatus as claimed in claim 5, wherein the pressure value is a maximum pressure value exerted on the touch screen by the object during a process of the object clicking on and departing from the touch screen, and the contact area is a maximum contact area between the object and the touch screen during a process of the object clicking on and departing from the touch screen.

* * * * *